United States Patent [19]

Breitling et al.

[11] 4,269,890
[45] May 26, 1981

[54] PROCESS AND APPARATUS FOR INTRODUCING FOAM INTO AUTOMOBILE BODY CAVITIES

[75] Inventors: Rolf Breitling, Sindelfingen; Wolfgang Mayer, Stuttgart; Wolfgang Labatzke, Sindelfingen, all of Fed. Rep. of Germany

[73] Assignee: Daimler-Benz Aktiengesellschaft, Stuttgart, Fed. Rep. of Germany

[21] Appl. No.: 946,648

[22] Filed: Sep. 28, 1978

[30] Foreign Application Priority Data

Oct. 25, 1977 [DE] Fed. Rep. of Germany ....... 2747721

[51] Int. Cl.³ .............................................. B29D 27/04
[52] U.S. Cl. ................... 428/320; 29/421 R; 264/45.2; 264/46.6; 264/314; 425/DIG. 14; 425/DIG. 112; 428/315
[58] Field of Search ..................... 264/45.2, 46.6, 46.5, 264/46.9, 314, 315; 425/DIG. 14, DIG. 112; 29/421 R; 428/320, 315

[56] References Cited

U.S. PATENT DOCUMENTS

| | | | |
|---|---|---|---|
| 1,177,240 | 3/1916 | Gates | 264/314 |
| 1,836,692 | 12/1931 | Twiss et al. | 264/314 X |
| 2,345,977 | 4/1944 | Howald et al. | 264/314 X |
| 2,517,902 | 8/1950 | Luebkeman | 264/314 X |
| 2,551,751 | 5/1951 | MacDougall | 29/421 R X |
| 2,612,924 | 10/1952 | Cunningham | 29/421 R X |
| 2,847,959 | 8/1958 | Switzer | 29/421 R X |
| 3,020,192 | 2/1962 | Stephens et al. | 29/421 R X |
| 3,048,169 | 8/1962 | Pierce | 264/46.5 X |
| 3,068,561 | 12/1962 | Jones | 29/421 R X |
| 3,104,422 | 9/1963 | Branick | 264/314 X |
| 3,310,615 | 3/1967 | Bender | 264/46.6 |
| 3,313,020 | 4/1967 | Krauskopf | 264/46.5 X |
| 3,362,061 | 1/1968 | Krasnitz | 29/421 R |
| 3,646,662 | 3/1972 | Green | 29/421 R |
| 3,949,988 | 4/1976 | Staufer | 264/314 X |
| 4,031,176 | 6/1977 | Molbert | 264/45.2 |
| 4,075,264 | 2/1978 | Hay | 29/421 R X |
| 4,136,141 | 1/1979 | Bauer et al. | 264/45.2 |

FOREIGN PATENT DOCUMENTS

| | | | |
|---|---|---|---|
| 656199 | 1/1963 | Canada | 264/45.2 |
| 913319 | 10/1972 | Canada | 264/45.2 |
| 1025011 | 4/1966 | United Kingdom | 29/421 R |

*Primary Examiner*—Philip Anderson
*Attorney, Agent, or Firm*—Craig & Antonelli

[57] ABSTRACT

A process and arrangement for introducing a material such as a foam into automobile body cavities for at least one of noise insulation or increased rigidity. The cavities may be provided with open spaces or be adapted to only be partially filled with the foam. A bag is initially introduced into the cavity with the bag being provided with a filler opening. The volume capacity of the bag corresponds approximately to the volume of the automobile body cavity or a portion of the body cavity which is to be filled with the foam. A mixture of expandable components is introduced into the bag and, following an expansion reaction or a setting, the foam fully fills the bag.

20 Claims, 3 Drawing Figures

PROCESS AND APPARATUS FOR INTRODUCING FOAM INTO AUTOMOBILE BODY CAVITIES

The present invention relates to a process and apparatus for introducing foam into cavities of automobile bodies or the like for the purpose of noise insulation and/or increasing the rigidity of portions of the automobile body and, especially, for automobile cavities which include one or more open spaces such as, for example, bores, perforations, fissures, etc., or cavities which are only to be partially filled with a foam material.

In filling automobile cavities with a mixture of expandable components, difficulties are encountered if the cavities are not leak-proof since any foam mixture of expandable components introduced into the cavity will leak out before the beginning of a blowing process or an expansion reaction of the components. Additionally, if the cavities are only to be partially filled with a foam or the like, a further difficulty resides in the fact that the mixture of expandable components may flow in the wrong direction and possibly fill the wrong section of the cavity.

The aim underlying the present invention essentially resides in providing a method and apparatus for introducing a material into cavities whereby a leakage of the material from the cavity prior to a setting of the material is prevented and/or only a desired, predetermined partial filling of the cavity is ensured.

According to advantageous features of the present invention, a bag is provided which is initially introduced into the cavity to be filled with the material with the bag being provided with an appropriate filler opening for permitting the introduction of the material into the interior of the bag. Preferably, the bag has a volume capacity which corresponds approximately to the volume of the cavity to be filled with foam. Subsequently, a mixture of expandable components is then introduced into the bag by way of the filler opening.

By virtue of the introduction of the mixture of expandable components into the bag disposed in the cavity in accordance with the present invention, any leakage from the cavities through open places or any flowing of the mixture of the components to undesirable locations, prior to the onset of an expansion or setting reaction, is advantageously prevented. With the onset of the expansion reaction or setting of the components, the foam fully fills the bag, and the bag contacts the wall of the cavity. Depending upon the size of the bag, the foam mixture will either fill the entire cavity or only partially fill the cavity.

With very greatly elongated cavities or cavities wherein difficulties are encountered during a fitting of the bag due to a complicated shape of such cavities, according to yet a further advantageous feature of the present invention, the bag may be temporarily filled with compressed air prior to the introduction of the mixture of expandable components so that the bag assumes a proper position by inflation and any obstacles for the subsequently introduced expanding foam material are eliminated.

In accordance with the present invention, the bag may be advantageously made of a synthetic resin or of a rubber. However, it is also possible in accordance with the present invention, to make the bag of a fabric, a hosiery-type material or a non-woven mat, with the bag being made of natural or synthetic fibers.

In accordance with a further feature of the present invention, the filler opening of the bag is provided with or constructed as a filler nipple so as to facilitate the introduction of the mixture of expandable components into the bag.

Accordingly, it is an object of the present invention to provide a process and apparatus for filling cavities which avoids, by simple means, shortcomings and disadvantages encountered in the prior art.

Another object of the present invention resides in providing a process and apparatus for introducing a material into cavities which ensures that the material is disposed in the proper location within the cavity.

Yet another object of the present invention resides in providing an apparatus for introducing a material into a cavity which functions reliably under all conditions.

A further object of the present invention resides in providing an apparatus for introducing a material into a cavity which is simple in construction and therefore inexpensive to manufacture.

A still further object of the present invention resides in providing a method and apparatus for the introduction of a material into a cavity by which a leakage of the material from the cavity is prevented.

These and other objects, features, and advantages of the present invention will become more apparent from the following description when taken in connection with the accompanying drawings which show, for the purposes of illustration only, one embodiment in accordance with the present invention, and wherein.

Figure 1:
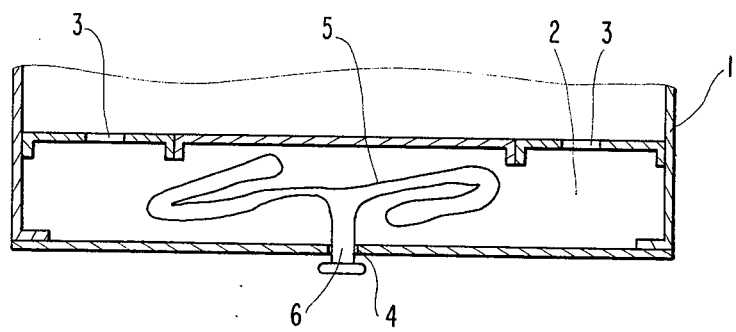
FIG. 1 is a partial cross-sectional view of a cavity of, for example, an automobile body, having a bag disposed therein in accordance with the present invention.

Referring now to the drawings wherein like reference numerals are used throughout the various views to designate like parts and, more particularly, to FIG. 1, according to this figure, a cavity 2 is provided in an automobile body part 1 with the cavity being adapted to be filled with a foam for the purposes of enhancing either the rigidity of the automobile body part 1 or to provide noise insulation.

If a mixture of expandable components were introduced into the cavity 2 by way of a bore 4, by virtue of apertures 3 or the like, the mixture would leak away prior to an onset of an expansion reaction or a setting of the components. To prevent a leakage or discharge of a mixture of expandable components, a bag 5 consisting of, for example, a synthetic resin, is introduced into the cavity 2 through the bore 4. Preferably, the bag 5 has the approximate dimensions or volume of the cavity 2. A filler nipple 6 is provided at the bag 5 with the nipple 6 projecting outwardly through the bore 4.

Figure 2:
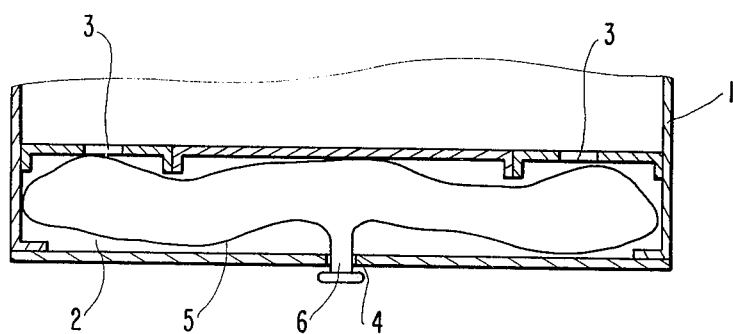
FIG. 2 is a partial cross-sectional view, similar to FIG. 1, in which the bag of the present invention is partially expanded so as to assume a proper position.
Figure 3:
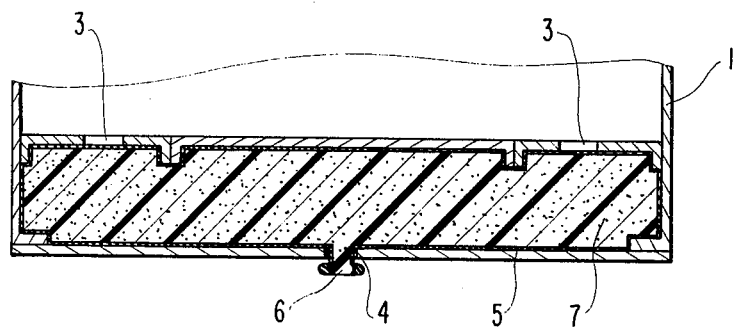
FIG. 3 is a partial cross-sectional view of the position of the bag of the present invention upon a termination of an expansion or setting reaction.

Since it is normally impossible to ascertain from the outside of the cavity 2 whether the bag has assumed a proper position within the cavity 2, compressed air may be temporarily forced through the filler nipple 6 into the bag 5 so that the bag changes or expands from the irregular position of FIG. 1 to a position such as illustrated in FIG. 2. Subsequently, the mixture of expandable components is then introduced by way of the filler nipple 6 into the bag so that an expansion reaction may begin. Upon a termination of the expansion reaction or setting of the mixture, as shown in FIG. 3, a foam 7 entirely fills the bag 5 and the cavity 2. The filler nipple 6 is then removed and, if necessary, the bore 4 may be sealed.

Depending upon the selection of the type of bag 5 and upon the configuration of the cavity 2, a more or less firm adhesive bond may be established between the walls of the cavity 2 and the outer surfaces of the bag 5. Due to the provision of undercut sections in the cavity, it is also possible to obtain a shape-mating connection between the bag 5 and the walls of the cavity 2.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A process for introducing a material, comprising a mixture of expandable components which form a resin foam, into a body cavity, wherein said body cavity is defined by a body having openings therein, comprising the steps of:
   (a) providing a bag having a predetermined volume, corresponding to an amount of the body cavity to be filled with the resin foam, and a filler opening means, said bag being in a non-filled condition;
   (b) introducing the bag in the non-filled condition into said body cavity; and
   (c) temporarily filling the bag with a fluid prior to the introduction of said material into the bag, whereby the bag assumes a proper initial position for introducing said material, by inflation, and obstacles to the flow of the subsequently introduced material in the bag is alleviated; and
   (d) introducing said material into the bag through the filler opening means, whereby said bag prevents said material from leaking out of said openings in the body prior to the foaming of said material.

2. A process according to claim 1, wherein said predetermined volume of said bag is less than the total volume of said body cavity, whereby the body cavity is only partially filled by the resin foam.

3. A process according to claim 2, wherein said material is at least one of a noise-insulating material and a material for increasing the rigidity of the body defining the body cavity.

4. A process according to claim 1 or 2, wherein the step of temporarily filling includes introducing a quantity of compressed air into the bag.

5. A process according to claim 1, wherein after said step of introducing said material into the bag, the material is caused to expand to the size of said predetermined volume by foaming, whereby a foam is formed.

6. A process according to claim 1 or 5, wherein the predetermined volume of said bag is the same as the volume of the body cavity.

7. A process for introducing a material, comprising a mixture of expandable components which form a resin foam, into a body cavity comprising the steps of:
   (a) providing a bag having a predetermined volume, corresponding to an amount of the body cavity to be filled with the resin foam, said predetermined volume being less than the volume of said body cavity, and a filler opening means, said bag being in a non-filled condition;
   (b) introducing the bag, in the non-filled condition, to a desired location in said body cavity;
   (c) temporarily filling the bag with a fluid prior to the introduction of said material into the bag, whereby the bag assumes a proper initial position, by inflation, for introducing said material, and obstacles to the flow of the subsequently introduced material in the bag is alleviated; and
   (d) introducing the material into the bag through the filler opening means, whereby said bag acts to properly position the material in the desired location in the body cavity.

8. A process according to claim 7, wherein after said step of introducing said material into the bag, the material is caused to expand to the size of said predetermined volume by foaming, whereby a foam is formed.

9. A process according to claim 1, 7 or 8, wherein the body defining the body cavity is an automobile body part.

10. A process according to claim 1, 2 or 7, wherein the mixture of expandable components is a mixture of expandable thermosetting resin components.

11. Product formed by the process of any one of claims 1, 2, 3, 5, 7 or 8.

12. Product formed by the process of claim 9.

13. An arrangement for introducing a material comprising a mixture of expandable components which form a resin foam into an automobile body cavity which is defined by a body having openings therein, comprising: a bag adapted to be introduced into the body cavity, the bag being made of a material consisting essentially of a component selected from the group consisting of a synthetic resin or rubber; means for positioning the bag in the body cavity; means for temporarily filling the bag with a fluid prior to the introduction of said material into the bag, whereby the bag assumes a proper initial position, for introducing said material, in the body cavity by inflation and obstacles to the flow of the subsequently introduced material in the bag is alleviated; and means for introducing the material into the bag, whereby the material is introduced into the body cavity and is prevented from leaking out of said openings in the body prior to the foaming of said material.

14. An arrangement for introducing a material comprising a mixture of expandable components which form a resin foam into an automobile body cavity which is defined by a body having openings therein, comprising: a bag adapted to be introduced into the body cavity, the bag being made of one of a fabric, a hosiery-type material, or a non-woven mat of natural or synthetic fibers; means for positioning the bag in the body cavity; means for temporarily filling the bag with a fluid prior to the introduction of said material into the bag, whereby the bag assumes a proper initial position, for introducing said material, in the body cavity by inflation and obstacles to the flow of the subsequently introduced material in the bag is alleviated; and means for introducing the material into the bag, whereby the material is introduced into the body cavity and is prevented from leaking out of said openings in the body prior to the foaming of said material.

15. An arrangement according to one of claims 13 or 14, wherein the bag is provided with a filler nipple means for permitting the material to be introduced into the interior thereof.

16. An arrangement according to claim 15, wherein the bag has a volume capacity corresponding approximately to a volume of the cavity.

17. An arrangement according to claim 15, wherein the bag has a volume capacity which corresponds only to a portion of a volume of the cavity, whereby the body cavity is adapted to be only partially filled by the resin foam.

18. An arrangement for introducing a material, comprising a mixture of expandable components which form a resin foam, into an automobile body cavity, the resin foam formed from the material occupying only a portion of the volume of the body cavity at a desired location, comprising: a bag adapted to be introduced into the body cavity, said bag having a predetermined volume which is less than the volume of the body cavity, whereby the resin foam only occupies a portion of said body cavity, the bag being made of a material consisting essentially of a component selected from the group consisting of a synthetic resin or rubber; means for positioning the bag at a predetermined location in the body cavity; means for temporarily filling the bag with a fluid prior to the introduction of said material into the bag, whereby the bag assumes a proper initial position, by inflation, for introducing said material, in the body cavity and obstacles to the flow of the subsequently introduced material in the bag is alleviated; and means for introducing the material into the bag, whereby the material is introduced into the body cavity and the resin foam formed from the material occupies a portion of the body cavity at a desired location.

19. An arrangement for introducing a material, comprising a mixture of expandable components which form a resin foam, into an automobile body cavity, the resin foam formed from the material occupying only a portion of the volume of the body cavity at a desired location, comprising: a bag adapted to be introduced into the body cavity, said bag having a predetermined volume which is less than the volume of the body cavity, whereby the resin foam only occupies a portion of said body cavity, the bag being made of one of a fabric, a hosiery-type material, and a non-woven mat of natural or synthetic fibers; means for positioning the bag at a predetermined location in the body cavity; means for temporarily filling the bag with a fluid prior to the introduction of said material into the bag, whereby the bag assumes a proper initial position, by inflation, for introducing said material, in the body cavity and obstacles to the flow of the subsequently introduced material in the bag is alleviated; and means for introducing said material into the bag, whereby the material is introduced into the body cavity and the resin foam formed from the material occupies a portion of the body cavity at a desired location.

20. An arrangement according to claim 18 or 19, wherein the bag is provided with a filler nipple means for permitting the material to be introduced into the interior thereof.

* * * * *